(12) United States Patent
Congia et al.

(10) Patent No.: US 12,503,757 B2
(45) Date of Patent: Dec. 23, 2025

(54) HOLDER FOR HOLDING A SUBSTRATE, IN PARTICULAR A SPECTACLE LENS, DURING VACUUM COATING THEREOF IN A BOX COATING APPARATUS AND DEVICE FOR LOADING/UNLOADING THE SUBSTRATE INTO/FROM SUCH HOLDER

(71) Applicant: Satisloh AG, Baar (CH)

(72) Inventors: Fabio Congia, Bollate (IT); Antonio Corea, Sedriano (IT); Arturo Colautti, Milan (IT); Gero Antonio Bongiorno, Cisliano (IT); Franco Moreni, Olgiate Olona (IT)

(73) Assignee: Satislog AG, Baar (CH)

( * ) Notice: Subject to any disclaimer, the term of this patent is extended or adjusted under 35 U.S.C. 154(b) by 714 days.

(21) Appl. No.: 17/853,507

(22) Filed: Jun. 29, 2022

(65) Prior Publication Data
US 2023/0002883 A1    Jan. 5, 2023

(30) Foreign Application Priority Data
Jun. 30, 2021 (EP) ..................................... 21000171

(51) Int. Cl.
*C23C 14/50* (2006.01)
*C23C 14/24* (2006.01)

(52) U.S. Cl.
CPC .............. *C23C 14/50* (2013.01); *C23C 14/24* (2013.01)

(58) Field of Classification Search
None
See application file for complete search history.

(56) References Cited

U.S. PATENT DOCUMENTS

| 4,929,054 A | 5/1990 | Ahmad et al. |
| 6,473,247 B1 | 10/2002 | Keller et al. |

(Continued)

FOREIGN PATENT DOCUMENTS

| CA | 2524482 C | * | 1/2012 | ....... H01L 21/67754 |
| CN | 208167087 U | | 11/2018 | |

(Continued)

OTHER PUBLICATIONS

Machine Generated English Translation of JP H0727155 (description). Published May 19, 1995. (Year: 1995).*

(Continued)

*Primary Examiner* — Sylvia MacArthur
(74) *Attorney, Agent, or Firm* — Reising Ethington P.C.

(57) ABSTRACT

A holder (10) for holding a substrate (L) during vacuum coating comprises a base body (12) with a masking portion (14) provided with an opening (16) adapted to receive the substrate. The opening in the masking portion is shaped to correspond to or closely match the shape of the substrate to be held without substantial gaps therebetween. The masking portion is provided with a slot (22) that extends radially outward from an inner edge (18) of the opening. A narrow spring arm of a spring arrangement mounted to the holder is received in the slot and adapted to resiliently bear against an outer edge (E) of the substrate to urge the substrate toward a support area (24) at the inner edge of the opening on a side opposite said slot. Further, a loading/unloading device (60) for loading the substrate into such holder and for unloading it therefrom is proposed.

20 Claims, 8 Drawing Sheets

(56) References Cited

U.S. PATENT DOCUMENTS

| | | |
|---|---|---|
| 10,913,999 B2 | 2/2021 | Di Paola et al. |
| 2004/0033768 A1 | 2/2004 | Diehl et al. |
| 2011/0067628 A1* | 3/2011 | Savoie ............. B29D 11/00423 |
| | | 118/500 |
| 2012/0186522 A1 | 7/2012 | Adachi et al. |
| 2015/0224531 A1 | 8/2015 | Meschenmoser et al. |
| 2016/0231464 A1 | 8/2016 | Boulineau |
| 2018/0237907 A1* | 8/2018 | Di Paola ................. C23C 14/24 |
| 2019/0137791 A1* | 5/2019 | Kreis .................. B24B 27/0069 |
| 2023/0002883 A1* | 1/2023 | Congia .................... C23C 14/50 |
| 2023/0278156 A1* | 9/2023 | Koerbe .................. B24B 13/06 |
| | | 269/56 |
| 2025/0042110 A1* | 2/2025 | Claar ............... B29D 11/00009 |

FOREIGN PATENT DOCUMENTS

| | | |
|---|---|---|
| EP | 1295962 A1 | 3/2003 |
| EP | 2460907 A1 | 6/2012 |
| FR | 2783055 A1 | 3/2000 |
| JP | H0727155 U | 5/1995 |
| WO | WO-2015048352 A1 * | 4/2015 ........... C23C 14/505 |

OTHER PUBLICATIONS

Machine Generated English Translation of JP H0727155 (claims). Published May 19, 1995. (Year: 1995).*

Extended European Search Report, Application No. 22181433.8-1103, Applicant: Satisloh AG, Date: Oct. 25, 2022.

European Search Report, Application No. 21000171.5-1103, Applicant: Satisloh AG, Date: Dec. 23, 2021.

"An Introduction to the Coating of Ophthalmic Lenses", Satisloh, Coating Brochure 2006.

Chinese 1st Office Action with English Translation, Application No. 202210768008.7, Applicant: Satisloh AG, Title: Holder and Device, Dated: Apr. 14, 2025.

* cited by examiner

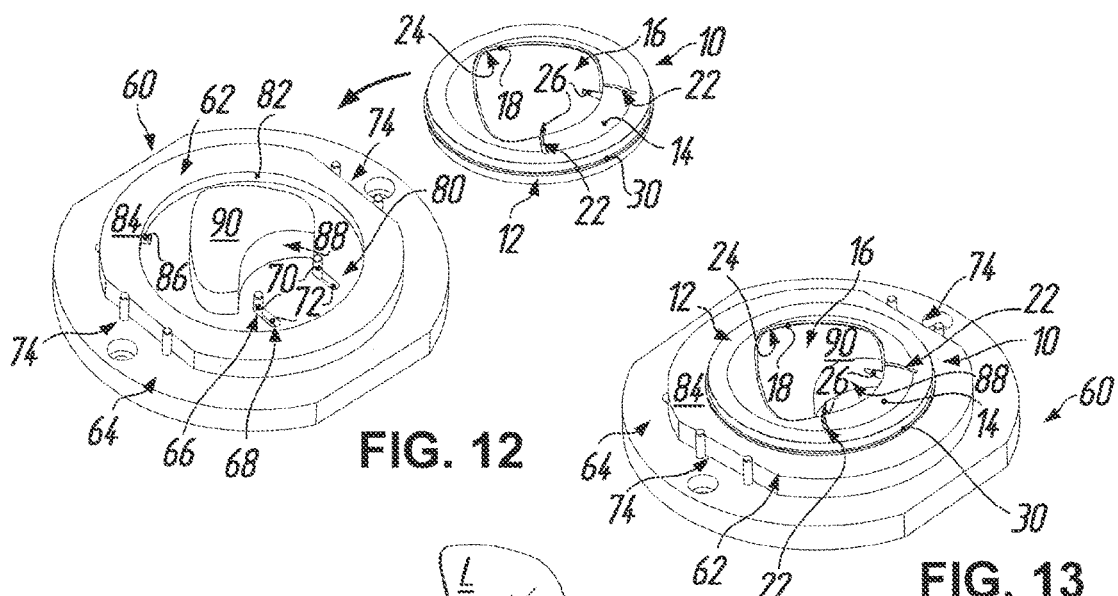
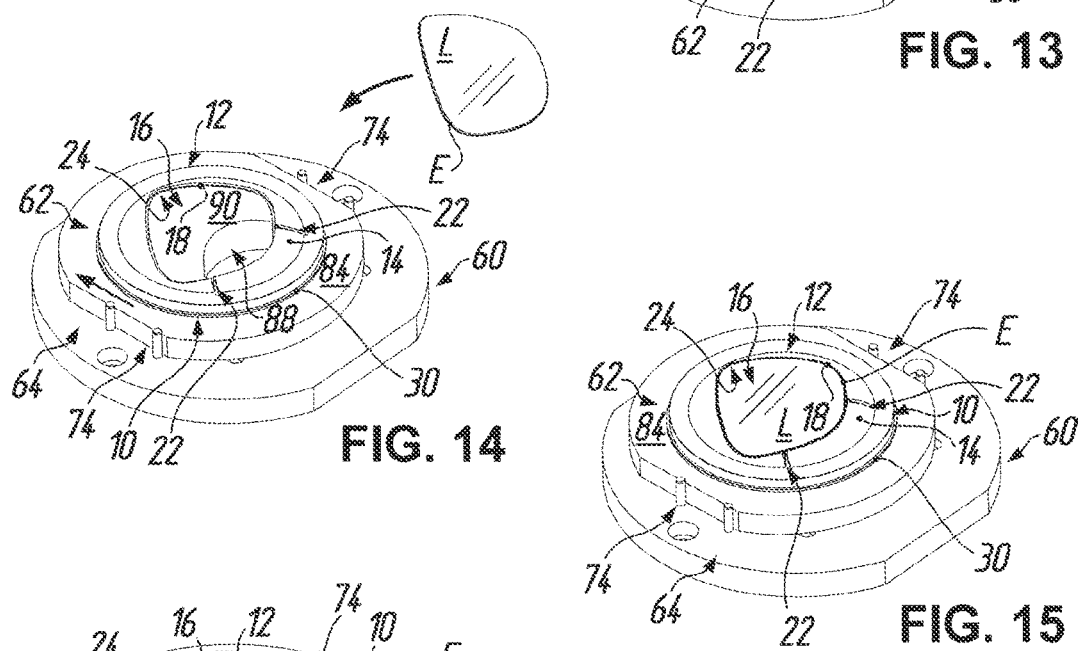
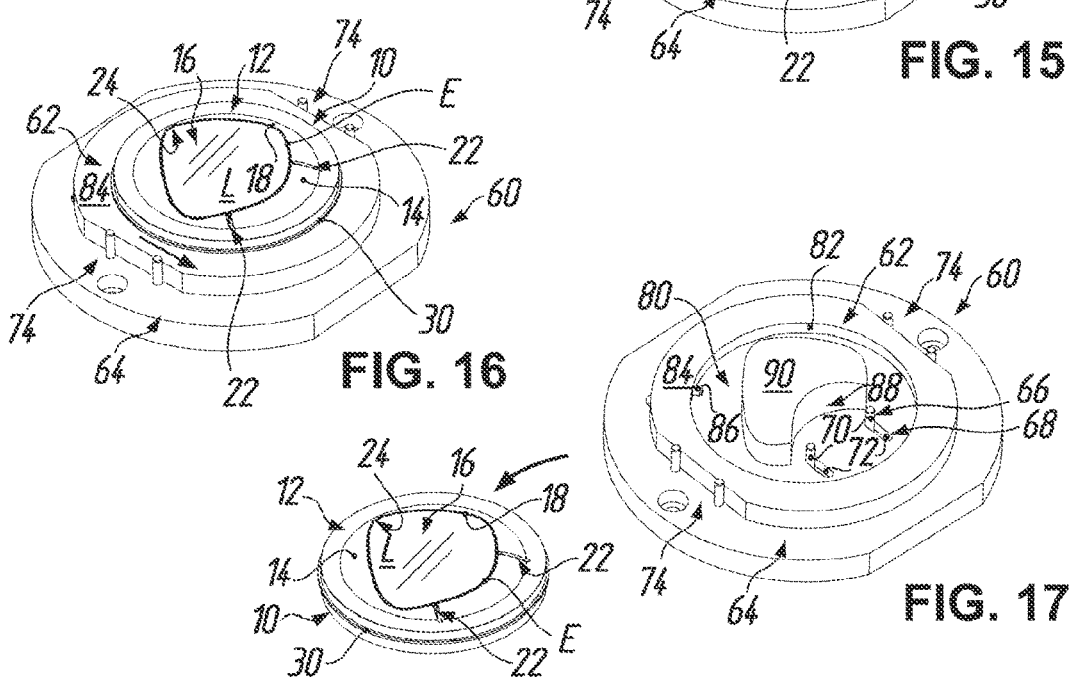

HOLDER FOR HOLDING A SUBSTRATE, IN PARTICULAR A SPECTACLE LENS, DURING VACUUM COATING THEREOF IN A BOX COATING APPARATUS AND DEVICE FOR LOADING/UNLOADING THE SUBSTRATE INTO/FROM SUCH HOLDER

TECHNICAL FIELD OF THE INVENTION

The present invention generally relates to a holder for holding a substrate during vacuum coating thereof in a box coating apparatus, according to the preamble portion of claim 1. Such apparatus generally serves the purpose of high vacuum deposition of multilayer thin films on substrates of various materials, both organic and inorganic, usually used in optical applications (physical vapor deposition (PVD) of thin films). The present invention also generally relates to a device used to load such holders with the substrate prior to coating and to allow removal of the coated substrate after coating.

In particular, the present invention relates to a holder for holding a spectacle lens during vacuum coating thereof in a box coating apparatus in a manner that prevents depositing coating material on undesired surface portions of the samples while coating the desired ones, and an assigned loading/unloading tooling, which shall be used within the frame of large-scale production of spectacle lenses, whether in the form of mere lenses for sunglasses and/or optically corrective lenses.

In this case, typically, the box coating apparatus serves the purpose of applying a multilayer antireflection (AR) coating and/or a mirror coating on the spectacle lenses in order to provide the latter with a low residual reflection, a desired color and/or a mirror effect. It can however also be used for other coating purposes, e.g., for applying on top of an AR coating a top coating (TC) selected from a group comprising hydrophobic, oleophobic and dust repelling coatings.

When, in the context of the present invention, the terms front side/surface or back side/surface of the substrate or lens are used, this should be regularly understood in relation to the evaporation source in the box coating apparatus, i.e., the side or surface facing the evaporation source in the box coating apparatus is front and the side or surface facing away from the evaporation source in the box coating apparatus is back. In other words, face or front surface may be used here to refer to a surface of an eyeglass lens that faces away from or toward the eye of the user when the eyeglasses are in use, while back surface may be used to refer to a surface of an eyeglass lens that faces toward or away from the eye of the user when the eyeglasses are in use.

PRIOR ART

In the optical coating (AR or mirrors) of ophthalmic lenses with the aid of box coaters technology—that commonly uses electron beam gun, thermal evaporation and ion assisted deposition (see, e.g., the brochure "An Introduction To The Coating Of Ophthalmic Lenses", 2nd Edition 2006, available from the present applicant, to which explicit reference shall be made at this point in respect of box coaters technology)—the standard procedure is to deposit the two sides of the lens (concave and convex) during two separate deposition cycles, exposing to the evaporate material only one face at the time while perfectly masking the other face by means of back deposition physical shields.

Hitherto the most preferred way to prevent back deposition on ophthalmic lenses is to place uncut lenses, i.e. lens blanks that still have a perfectly round shape, into diameter-compatible rings as individual holders and then, together with the associated rings, into a sector of the dome-shaped substrate holder of the box coating apparatus. In this approach, the sectors themselves play the role of a back deposition shield. Sometimes, when the production workflow makes it economically reasonable, "ringless" sectors can be used, i.e. sectors in which the lens blanks are directly placed without intermediate rings, and the back deposition principle would still be the same.

In some applications, manufacturers of ophthalmic lenses prefer to coat edged/shaped lenses. In this situation, two approaches are possible: 1) The manufacturers work with standard lens shapes, and ringless sectors are being used, in which cuts or openings for receiving the lenses to be coated each have the shape of the desired lens. In this case, the back deposition phenomenon is avoided. 2) The manufacturers work with special spring rings, i.e. circular rings, which are provided on their inner circumference with spring arms for clamping the edged/shaped lenses, and standard sectors for accommodating such spring rings are being used. In this case, some back deposition can occur, and the customer tolerates the reduction in quality level of the final product.

A general alternative that some manufacturers can decide to adopt, that relies on the above spring ring solution, is represented by a flip-over sequence strategy. With this strategy, the lenses are flipped over after each coating step to build up the multilayer stack in parallel on both sides of each lens. Flip-over tooling uses spring rings to avoid lenses falling down from the substrate holder when flipped. This strategy can be used with both uncut and edged lenses, and allows some back deposition: even if the flipping sequence takes care that back deposition happens with compatible evaporate materials, it is still well known in the field that quality wise the flip-over technology suffers as compared to the "two cycles with back deposition shields" approach.

In this context, documents US 2016/0231464 A1 and EP 1 295 962 A1, respectively, already disclose a holding ring for a spectacle lens, especially for the application of coating spectacle lenses, which is designed to have a masking function in addition to the holding function.

To be more precise, document US 2016/0231464 A1 shows a system for coating an optical lens by vapor deposition, that employs a housing or drum as a main holding device having a plurality of apertures that each receives a lens holder assembly. In one embodiment (see FIG. 13 of this document), the ring-shaped lens holder assembly has an annular retaining lip, against which the lens to be held is pressed by a spring mechanism on the side of the main holding device. By using such lens holder assembly, the backside of the lens is reliably protected from any overspray of the coating material. However, in such a design of the lens holder assembly a certain edge area of the surface to be coated is necessarily masked, which may be undesirable for certain applications.

In case of electrochromic eyewear, for example, where glass lenses have to be coated with indium titanium oxide (ITO) only after being edged and tempered, because both edging and tempering production steps can damage the ITO layers, the ITO coating should cover the whole surface of the edged lenses. A very narrow area at the edge of the surface only—e.g., of 200 microns width—is allowed not to have a coating, because of functional electrical contacting of the ITO layer that must be placed at the very edge of the lens.

Other lens holder assemblies disclosed in this prior art (cf. FIGS. 4 and 14 of document US 2016/0231464 A1) have spring arrangements comprising spring arms distributed around the inner circumference for holding the edged lens, but do not have any masking function for the backside of the lens. In case of, e.g., lenses for electrochromic eyewear, however, no back deposition is allowed.

As a result, the holder assemblies disclosed in document US 2016/0231464 A1 are not suitable for certain applications, for instance lenses for electrochromic eyewear, because they result in either undesirable rim shading of the side of the lens to be coated or undesirable coating of the side of the lens that is actually not to be coated.

Further, document EP 1 295 962 A1 forming the preamble portion of claim 1 discloses (see FIG. 2 thereof) a holder for holding a spectacle lens as a substrate during vacuum coating thereof in a box coating apparatus, wherein a shape of the substrate, as seen in a plan view, is defined by an outer circumferential surface of the substrate. The holder comprises a base body about a longitudinal axis, with an areal masking portion which is bounded radially outwards with respect to the longitudinal axis by a circumferential rim of the base body and which is provided with a central mounting opening that has an inner circumferential surface adapted to receive the spectacle lens with its outer circumferential surface. Further, a spring arrangement is mounted with respect to the base body to engage with the outer circumferential surface of the spectacle lens so as to hold the spectacle lens within the mounting opening of the holder.

To be more precise, the known spring arrangement comprises two spring elements on opposing sides of the mounting opening of the holder. Each spring element has two spring legs with one free end each, on which a clamping piece is provided for elastic contact with the edge of the spectacle lens to be held within the mounting opening. Even though each spring leg is slotted to accommodate a portion of the holder in the area of the mounting opening, so that the respective spring leg is not completely located in the gap between the outer circumference of the spectacle lens and the inner circumference of the mounting opening, said gap must still be large enough to receive the clamping pieces on the spring elements. This poses a certain risk of coating material getting onto the back of the spectacle lens during coating, which must be avoided in some applications.

The above-described design of the spring elements with slotted spring legs also necessitates a certain amount of protrusion of the spring legs with respect to both faces and near the edge of the spectacle lens to be coated. This protrusion in the area of the spring legs and the clamping pieces of the spring elements can lead to a certain shading of the side of the spectacle lens to be coated against the coating material, which may be visible on the finished coating as a coating defect. Such visible defects of the coating in the edge area of the lens are, of course, also undesirable if the lens is not to be or may not be processed at the edge after coating.

In this context, document EP 2 460 907 A1 discloses a vapor deposition apparatus for optical lenses, which includes a lens holding body having a plurality of lens holes formed to be slightly larger than the optical lenses to be received. According to, in particular, FIGS. 2 and 4 of this document each lens hole is provided with four recesses that are formed at angular intervals of about 90° between them in the circumferential direction of the lens hole. Two opposing recesses among these four recesses are formed with the same semicircular shape having a size that allows a fingertip to be inserted into them, thus making it possible to manually insert the lens into the lens hole or to grip a lens located in the lens hole at its outer circumference. Accordingly, these two recesses communicate with the lens hole, and open on the front and back surfaces of the lens holding body. The first recess of the remaining two opposing recesses is formed only in the front surface of the lens holding body along the peripheral edge defining the lens hole, and forms a mounting portion for a leaf spring as a holding means for pressing the outer peripheral surface of the optical lens in the respective lens hole of the lens holding body. This mounting portion is formed to be elongated in the circumferential direction of the lens hole, thus exposing the edge of the optical lens received in the lens hole over a larger angular range. The second recess of the remaining two opposing recesses is again formed to open on the front and back surfaces of the lens holding body. This recess has two open edges which form lens receptacles, respectively, that receive an outer peripheral surface portion of the optical lens to linearly support it.

Further, a substrate storage disc which can be handled as if it were a single substrate in a thin film vacuum coating process is shown in FIG. 5 of document JP H07 27155 U. This previously known substrate storage disk has a flat circular ring shape, with a cylindrical inner circumferential surface for receiving the substrate, for example a circular wafer. On one side, the substrate storage disk is provided with a recess which is square as viewed in a plan view and opens to the cylindrical inner circumferential surface. A pressing piece is arranged in the recess, which can move radially inwards or outwards in the recess. The pressing piece is pretensioned by a compression spring, which is also accommodated in the recess and presses the pressing piece radially inwards. In doing so, the pressing piece as such protrudes radially inward beyond the inner circumferential surface of the substrate storage disk in order to engage with the substrate. As a result, the substrate is pressed against the inner circumferential surface of the substrate storage disk on the side opposite the recess and is thus held in the substrate storage disk in a force-fit. This creates a relatively large, sickle-shaped gap on both sides of the pressing piece between the inner circumferential surface of the substrate storage disk and the substrate.

Insofar, the substrate holder solutions according to documents EP 2 460 907 A1 and JP H07 27155 U have in common that there are openings (recesses or sickle-shaped gaps) at the outer circumference of the respectively held substrate, which are not masked at all and are so large that they entail the risk that coating material can reach the rear side of the substrate via these openings during coating, which is undesirable for some applications (see above). Also, in both cases, the spring arrangements for holding the substrate are located entirely between the edge of the held substrate and the inner circumferential surface of the opening for receiving the substrate, so that there is also a risk of inadequate masking in this area, via which coating material can undesirably reach areas of the substrate that should actually not be coated.

Furthermore, document U.S. Pat. No. 4,929,054 discloses a mounting for high resolution projection lenses, that includes a lens cell in which a lens is mounted through flexures. To be more precise, the lens cell is machined with a spherical seat for a lens concentric with an axis of rotation. An outer diameter of the lens cell is concentric with the axis of rotation, and top and bottom surfaces of the lens cell are machined perpendicular to the axis of rotation. Three flexure assemblies are then affixed to the inner diameter of the lens cell. The lens cell is then placed on an air-bearing table and centered on its axis of rotation by indicating the reference outer surface by using an electronic/air gauge. The lens is then placed on its seat in the lens cell. An electronic/air gauge is again used to indicate the top surface of the lens, and the air-bearing table is rotated. The lens is then moved on its seat, relative to the lens cell, so as to minimize the wobble of the top surface of the lens. At this stage, the axis of the lens is concentric with the axis of the air-bearing table and the axis of the outer diameter of the lens cell. The lens is then bonded to the three flexures. Accordingly, this prior art does not concern a substrate holder for coating processes, in which the substrate is to be removed from the holder again after the respective coating process.

Finally, document U.S. Pat. No. 6,473,247 B1 corresponding to document FR 2 783 055 A1 shows and describes an optical lens support and a method for using the same in a processing apparatus utilizing a spin coating technique as contrasted to a vacuum coating technique. In one embodiment (FIGS. 11 and 12), the support is adapted to hold an optical lens whose contour is not circular. To this end, the support includes three bearing studs carried by a base, for gripping the optical lens by its edge, wherein one of the studs is directly fixed relative to the base and the other two studs are each carried by an assigned elastically deformable arm that in turn is mounted to the base. Again, this known optical lens support does not have any masking function for the backside of the lens and, as such, is not suitable for certain applications (see above), e.g., the vacuum coating of lenses for electrochromic eyewear.

What is desired, starting from the prior art as outlined above, of creating a holder for holding a substrate, in particular a spectacle lens, during vacuum coating thereof in a box coating apparatus, which is capable of reliably holding the substrate during coating without partially covering or undesirably shading the front side of the substrate to be coated, while providing a masking function for the backside of the substrate to prevent back deposition. The object underlying the present invention also encompasses the provision of a related loading/unloading device for loading a substrate, in particular a spectacle lens, into such holder prior to coating and for unloading the substrate from the holder after coating in an efficient and substrate-friendly way.

ILLUSTRATION OF THE INVENTION

According to one aspect of the invention—in case of a holder for holding a substrate, in particular a spectacle lens, during vacuum coating thereof in a box coating apparatus, a shape of the substrate, as seen in a plan view, being defined by an outer circumferential surface of the substrate, which holder comprises a base body about a longitudinal axis, with an areal masking portion which is bounded radially outwards with respect to the longitudinal axis by a circumferential rim of the base body and which is provided with a central opening having an inner circumferential surface adapted to receive the substrate with its outer circumferential surface, and a spring arrangement mounted with respect to the base body to engage with the outer circumferential surface of the substrate so as to hold the substrate within the opening of the holder—the opening in the masking portion, as seen in a plan view, is shaped to correspond to or at least closely match the shape of the substrate to be held without substantial gaps therebetween, wherein the masking portion is provided with at least one slot having a length dimension and a width dimension substantially smaller than the length dimension and extending with its length dimension oriented essentially radially outward from the inner circumferential surface of the opening, said inner circumferential surface forming a support area for the substrate on a side of the opening opposite the slot, and wherein the spring arrangement has at least one spring arm which is tightly received in the slot and adapted to resiliently bear against the outer circumferential surface of the substrate to urge the substrate in the direction of the support area, while a remainder of the spring arrangement, which at least serves to fix the spring arrangement to the base body, is covered by the masking portion.

In other words, first, according to the invention the opening in the masking portion is shaped and sized to accommodate the substrate with maximum tightness to prevent backside deposition. The actual shape and dimensions of the opening must be matched to the shape and dimensions of the individual substrate to be coated, also depending on parameters of the respective coating process and the materials of the holder (such as stainless steel, aluminum alloy or plastic) and the substrate (e.g. mineral glass or plastic). In the above-mentioned case of electrochromic eyewear, for example, where lenses made of mineral glass have to be coated with ITO, the process temperatures during coating are about 350° C., so stainless steel is a suitable material for the holder in such case. The dimensions of the opening in the masking portion must then be selected, taking into account the different coefficients of expansion of the materials of the holder and substrate, in such a way that the substrate with its outer circumferential surface is not firmly pressed against the inner circumferential surface of the opening even at such high temperatures, so that the substrate cannot be damaged, but at the same time there is no larger gap between the holder and substrate that could lead to an undesired backside deposition. When dimensioning the opening, it must then of course also be taken into account that larger substrates tend to "grow" more at higher temperatures than smaller substrates, etc. Against this background, it is clear to the person ordinarily skilled in the art that no final or fixed absolute shape and dimensioning information for the opening in the masking portion can be given at this point; the shaping and dimensioning of the opening in the masking portion must rather be carried out in the individual case, according to the respective coating requirements, the materials involved and of course the shape of the substrate.

In an example in which stainless steel is used as the material for the base body of the holder while the substrate is made of mineral glass, the relative dimensioning of the central opening in the masking portion of the base body to the outer circumference of the substrate can be provided such that there is a circumferential gap of one to just a few tenths of a millimeter width therebetween when no spring force is applied to the substrate. These are then not "substantial gaps" within the meaning of the claimed teaching, which would result in an undesirable coating on the backside of the substrate. At this point it should also be noted that a "masking portion" within the meaning of the present invention—which according to the claimed teaching extends clearly defined from a radially outer rim of the base body with respect to the longitudinal axis thereof up to the central opening in the base body and which is functionally intended to prevent a backside coating of the substrate—must of course also not be provided at any other location, e.g. in the immediate vicinity of the central opening, with excessively large recesses or apertures. Such recesses or apertures would even entail the risk of an undesirable backside coating and thus run counter to the sense and purpose of the masking portion according to the invention.

In this context, the at least one "slot" provided in accordance with the invention, which has a length dimension and a width dimension substantially smaller than the length dimension and extends with its length dimension oriented essentially radially outward from the opening in the masking portion, is of particular importance. Such elongated slot, in fact, allows the tight reception of the at least one spring arm of the spring arrangement, which thus does not have to be located as a whole in the space between the inner circumferential surface of the opening in the masking portion and the outer circumferential surface of the substrate, unlike in the prior art described above, but can nevertheless engage the outer circumference of the substrate. In this context, claim 1 also clearly states that the spring arm of the spring arrangement only is accommodated in the slot, while the remainder of the spring arrangement, which in any case serves to fix the spring arrangement with respect to the base body, is covered by the masking portion of the base body or lies below the masking portion so that it is not exposed to the coating material during the coating process when the front side (only) of the substrate is coated. This enables the substrate to be held reliably in the holder without at the same time having to provide a special installation space in between for the spring arrangement, which would again entail the risk of backside deposition.

As noted above already, one embodiment includes a dimensioning and alignment instruction for the at least one elongated slot in the masking portion of the base body. Namely, the slot shall have a width dimension that is "substantially smaller" than its length dimension, and shall extend with its length dimension "essentially radially outward" from the inner circumferential surface of the opening in the masking portion. The term "substantially smaller" in this context means that the slot should be at least twice as long as it is wide. In a specific example, the slot may be about 5 to 12 times as long as wide. Furthermore, the expression "essentially radially outward" means that the slot, with its length extension direction, does not necessarily have to be radially aligned with respect to the longitudinal axis of the base body, but rather extends primarily radially outward from the opening—as opposed to circumferentially with respect to the opening. In doing so the slot can be straight or also slightly curved along its main, i.e. length extension direction, depending on the design of the spring arrangement or the spring arm of the spring arrangement.

Furthermore, according to an aspect of the invention, there is a reciprocal relationship between the geometries of the slot in the masking portion of the base body and the spring arm of the spring arrangement. These geometries are to be matched to each other in such a way that the spring arm is tightly or closely received in the slot. The claimed term "tightly received" in this context means that the spring arm should be able to move in the slot with only a narrow distance, if at all, to one or both slot walls without jamming in the slot. Ideally, the spring arm is guided in the slot with essentially no lateral play. Again, the gap dimensions mentioned above must be taken into account here. There should therefore be no gaps between the slot and the spring arm that are so large that they could give rise to the risk of undesirable backside deposition A further advantage of the invention consists in the fact that support structures (support rim or the like) for the front side of the substrate as provided for in part in the prior art described above are not necessary; rather, the substrate is held in the holder only in the area of the substrate edge via the spring arrangement and the support area at the inner circumferential surface of the opening in the holder, and this with primarily radially acting, low holding forces which generate a frictional connection at the outer circumferential surface of the substrate—which can be superimposed with a positive connection at the end of the spring arm of the spring arrangement if necessary. As a result, the front side of the substrate can be coated most completely, i.e. all the way to the edge, without causing shading on the front side or allowing the coating material to reach the backside of the substrate.

In principle, one slot with an associated spring arm of the spring arrangement is sufficient to hold the substrate, with the spring arm engaging the substrate on one side of the substrate and pressing the substrate with its outer circumferential surface against the inner circumferential surface of the opening in the support area on the opposite side. Preferably, however, the masking portion is provided with two of said narrow slots, in each of which one spring arm of the spring arrangement is received, wherein the slots are angularly offset from each other with respect to the longitudinal axis of the holder so that the spring arms are capable of urging the substrate toward the support area at the inner circumferential surface of the opening from different directions. Depending on the holding requirements and/or the shape of the substrate, the slots and spring arms can also be arranged on opposite sides with respect to the substrate, or more than two slots with associated spring arms, e.g. three slots/spring arms, can be provided suitably distributed about the longitudinal axis to hold the substrate in a "floating" manner within the opening of the masking portion, i.e. without direct contact with the inner circumferential surface of the opening.

If two spring arms are provided in accordance with the respective holding requirements and the spring arms accommodated in the slots can be arranged relatively close together, it is beneficial in a preferred embodiment of the holder if the spring arrangement comprises two spring portions arranged mirror-symmetrically to each other, each spring portion having a base section to which one of the spring arms is connected in an angled manner via an intermediate section, wherein the base sections are bearing against each other and are fixed with respect to the base body of the holder, and wherein the above mentioned remainder of the spring arrangement that is covered by the masking portion of the base body is formed by the base and intermediate sections of the spring portions. Such design of the spring arrangement is not only simple, but the individual spring portions also support each other in an advantageous manner during their resilient bending or deflection. In this context, it should also be noted that the spring arms as such do not necessarily have to be resilient themselves if other components of the spring arrangement perform the spring work. Thus, in the preferred embodiment, the spring arms are primarily responsible for engaging the edge of the substrate, while the elasticity of the spring arrangement is mainly provided by the intermediate sections of the spring portions, wherein the base sections of the spring portions serve primarily to secure the spring arrangement with respect to the base body and to absorb forces.

In principle, it is conceivable that the spring arms merely engage with the edge of the substrate to be held in a force-fit. In a preferred embodiment of the holder, however, in order to increase the holding strength, e.g., for a flip-over operation of the holder, each spring arm can have at a free end thereof an essentially C-shaped profile for positive engagement with the outer circumferential surface of the substrate to be held.

In a further preferred embodiment of the holder each spring arm may be chamfered at a side surface thereof facing the outer circumferential surface of the substrate to be held such that, as seen in section, a substantially V-shaped gap remains between the outer circumferential surface of the held substrate and said side surface of the spring arm, by which the spring arm is spaced from a face surface to be coated of the substrate. Accordingly, in such embodiment there is always a certain distance between the side surface of the spring arm and a boundary line between the edge and the face surface of the substrate to additionally counteract the risk of coating defects on the face surface of the substrate near the edge of the substrate.

In accordance with an aspect of the invention, the configuration of the holder may be such that each spring arm on a side facing in the same direction as the masking portion is slanted toward a face surface to be coated of the substrate to be held so that there is no step between said side of the spring arm and the face surface that could obstruct coating material from reaching the face surface during a coating operation. In other words, the or each spring arm is designed to make itself "small" in the direction of its engagement with the substrate so as not to interfere with proper coating of the face surface of the substrate. In the case of multiple spring arms, this also means that the individual spring arms can have different heights and geometries on a case by case situation, depending on the edge profile and rim geometries of the substrate to be coated to make sure that the full face surface of the substrate is coated with no shadow effects.

In a particularly simple embodiment of the holder in terms of production technology, it can further be provided that the inner circumferential surface of the opening in the masking portion, as seen in section, is essentially parallel to the longitudinal axis of the holder. However, also depending on the shape of the edge of the substrate, the inner circumferential surface of the opening may alternatively be beveled to provide—in addition to the holding force of the spring arrangement—a mechanical barrier against the substrate falling through the opening.

With regard to a simple and uncomplicated use of the holder in known box coating apparatuses, it is further preferred if the base body of the holder comprises a ring portion of hollow cylindrical shape, which forms the above-mentioned circumferential rim of the base body, adjoins and delimits the masking portion and is adapted to be received in a substrate holder of the box coating apparatus. Thus, advantageously, a standardized interface can be used on the sectors of the dome-shaped substrate holder of the box coating apparatus, i.e. special receptacles for the holder are not required and the associated expense is avoided.

With a view to supporting the holder in the sector of the substrate holder of the box coating apparatus in a simple form-fitting manner, it can further be provided that the ring portion of the base body is provided on its outer circumference with an annular protrusion that is adapted to secure the holder in the substrate holder of the box coating apparatus. In this case, it is further preferred if the annular protrusion is arranged at essentially half height of the ring portion. This also allows for flip-over operation of the holder, which is always securely supported via the annular protrusion in the respective sector of the substrate holder of the box coating apparatus, regardless of its orientation.

Further, preferably the ring portion of the base body comprises a recess for angular orientation of the holder about the longitudinal axis. A rotation angle orientation of the holder around the longitudinal axis is thus easily possible, for example in the sector of the substrate holder of the box coating apparatus, in an assembly tool for the substrates or in the loading/unloading device still to be described, for loading the substrate into the holder and for unloading the substrate from the holder.

Furthermore, in principle, the masking portion of the base body can be flat, for example, with a certain material thickness in order to be able to cover height differences around the circumference of the substrate. However, with a view to avoiding as far as possible steps or rims in the area of the substrate edge and the associated risk of shading at certain coating angles, it is preferred if the masking portion of the base body, as seen in section, has a curvature that is adapted to essentially match a curvature of the substrate.

According to a further aspect of the invention, a loading/unloading device for loading a substrate, in particular a spectacle lens, into the above described holder and for unloading the substrate from the holder is provided, which comprises a holder receptacle for receiving the holder, which is movably guided with respect to a base plate between a loading/unloading position and a holding position for the substrate with respect to the holder, wherein the base plate is provided with at least one release protrusion that is fixed with respect to the base plate and extends through an associated recess in the holder receptacle to be selectively engageable with the spring arrangement of the holder, wherein the release protrusion is arranged to hold the spring arrangement apart from the substrate in the loading/unloading position of the holder receptacle and to release the spring arrangement to abut the substrate in the holding position of the holder receptacle so that the substrate is held in the holder.

Such a loading/unloading device advantageously facilitates the loading and unloading of the substrate into and from the holder with relatively little technical effort. Depending on the respective process requirements, the placement of the substrate in the holder and/or the removal of the substrate from the holder can be carried out manually, partially or fully automatically with the aid of the loading/unloading device. In the case of (partially) automated handling of the substrates and/or the holders, suitable aids (robot, control system, etc.) for moving the holder and/or substrate must then of course be provided, as well as a suitable drive, if necessary, to effect the movement of the holder receptacle with respect to the base plate from the loading/unloading position to the holding position for the substrate with respect to the holder and vice versa. Such automation measures are familiar to those skilled in the art and therefore need not be explained in detail here. Such a loading/unloading device also advantageously eliminates the need for holes or recesses in the holder, which are provided in the prior art described above in part to allow the substrate to be manually gripped at the edge with the fingers, but which can ultimately cause a problem with regard to an undesirable coating on the back of the substrate.

In principle, it is conceivable that during loading or unloading into or from the holder, the substrate is held by a suction cup or the like while the spring arrangement is brought into or out of engagement with the substrate. However, especially with regard to the cleanliness of the process and to avoid any (suction) marks on the surface of the substrate, it is preferred if the holder receptacle has a support surface in a central region of the holder receptacle, which serves to seat the substrate during a loading/unloading phase. Such support surface can be formed by a single surface with a geometry, in particular a curvature that corresponds to the geometry of the substrate surface to be placed on the support surface. However, other designs of this support surface are also possible, for example a formation of the support surface by three pins with spherical cap-shaped ends for supporting the substrate surface.

To ensure in a simple manner a general spatial positioning of the holder with respect to the holder receptacle, which would be especially helpful for a (partially) automated loading/unloading process, it may further be provided that the holder receptacle comprises a centering geometry for the holder, which is formed by a recess—as a "negative" geometry—or at least one projection—as a "positive" geometry—of the holder receptacle adapted to cooperate with the base body of the holder.

With regard to a most simply designed angular positioning of the holder in the loading/unloading device, it is further preferred if the holder receptacle comprises a protrusion adapted to engage with the recess in the base body of the holder for angular orientation of the holder about the longitudinal axis with respect to the holder receptacle.

In a practical embodiment of the mechanism provided in the loading/unloading device for tensioning and relaxing the spring arrangement of the holder for its engagement at the outer circumferential surface of the substrate, it may be provided that two cylinder pins are mounted to the base plate as said release protrusions which extend through associated oblong holes in the holder receptacle, wherein the cylinder pins are capable of engaging with the intermediate sections of the spring arrangement of the holder for holding/releasing the spring arrangement with respect to the substrate.

In principle, there are various ways of causing the spring arrangement on the holder to be tensioned or relaxed by a relative movement between the holder receptacle and the base plate on the loading/unloading device, of course also depending on the respective design of the spring arrangement on the holder. For example, there may be a rotational relative movement between the holder receptacle and the base plate about the longitudinal axis or a pivotal movement between the holder receptacle and the base plate about an axis offset from the longitudinal axis. In a currently preferred embodiment, however, the holder receptacle is guided with respect to the base plate by a guide arrangement in an axial direction transverse to the longitudinal axis.

This axial guide arrangement could finally be formed by e.g. protruding bars or the like or a guide geometry with grooves on the base plate, in each case with a suitably shaped counter geometry on the holder receptacle. However, with a view to keeping the design as simple and economical as possible, it is preferred if the guide arrangement comprises cylindrical pins mounted to the base plate, which interact with parallel side faces of the holder receptacle.

BRIEF DESCRIPTION OF THE DRAWINGS

The invention is explained in more detail in the following by way of a preferred embodiment of a removable individual holder for holding a spectacle lens as a substrate during vacuum coating thereof in a box coating apparatus, and by way of a loading/unloading device for loading the substrate into such holder prior to coating and for unloading the substrate from the holder after coating, with reference to the accompanying, partly simplified or schematic drawings. In the drawings:

FIG. 12 to FIG. 17 show perspective views of the loading/unloading device according to FIGS. 8 to 10 and the individual holder of FIGS. 3 to 7 obliquely from above, illustrating the sequence of loading the substrate into the holder with the aid of the loading/unloading device;

Figure 1:
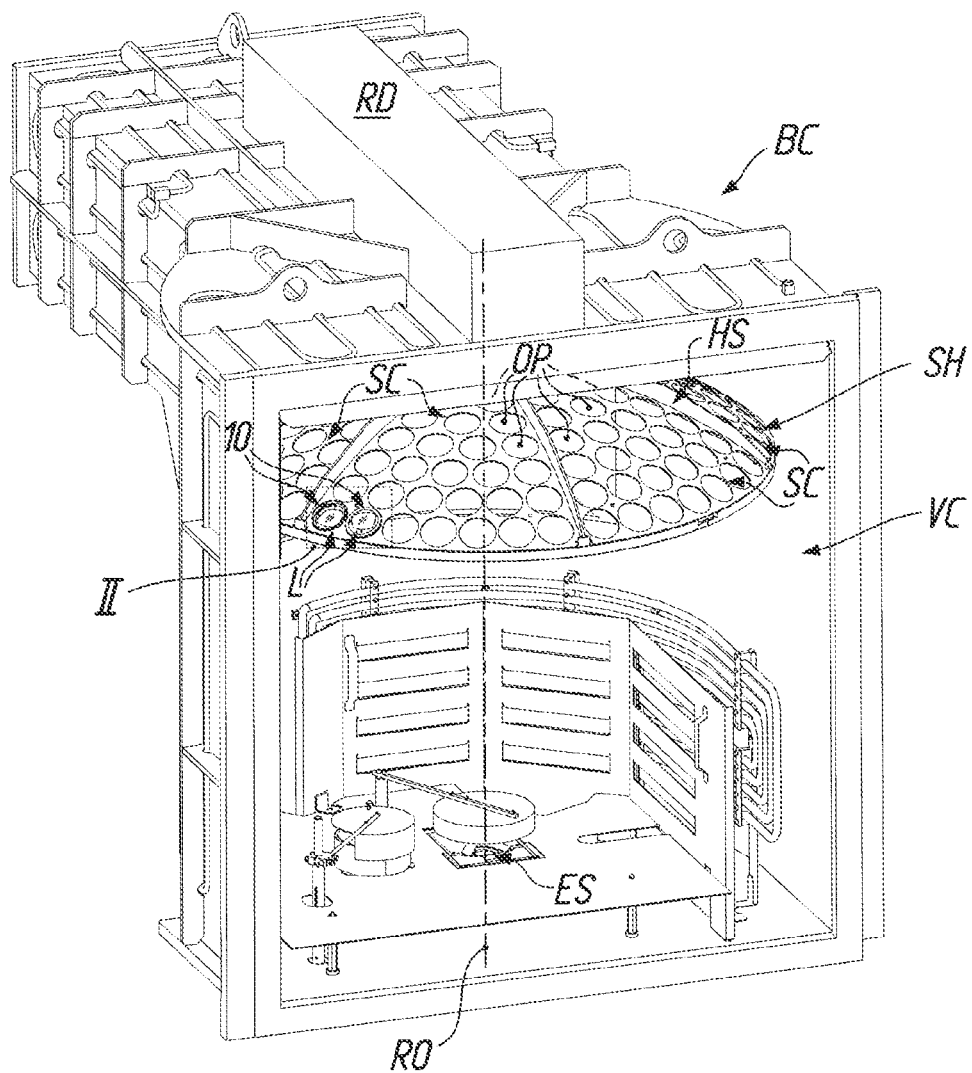
FIG. 1 shows a perspective view of a box coating apparatus for, in particular, vacuum coating of spectacle lenses as substrates which are movably held by a dome shaped substrate holder about a central axis of rotation in a vacuum chamber, obliquely from above and front left, wherein the substrate holder comprises sectors each having a plurality of openings for receiving individual holders for a respective substrate, and wherein exemplarily two individual holders according to the invention are shown in a condition inserted in openings of the front sector and each holding a substrate.

As to FIG. 1, it is to be noted at this point that for simplification of the illustration, apart from parts of the cladding, walls and door of the box coating apparatus, the operating unit and control system (electrical cabinet), screens, handling devices and deposits for the substrates and consumables, the supply and conditioning devices—inclusive of lines, hoses and pipes—for current (transformers), compressed air, vacuum (high vacuum pump set) and cooling water (water thermo conditioner, cascade cooler, water chiller) as well as the measuring, maintenance and safety devices, in particular, were also mostly omitted from FIG. 1, in every instance to the extent that they are not required for understanding of the invention. These omitted parts, assemblies and devices, in structure and function, are known to the person ordinarily skilled in the art anyway.

DETAILED DESCRIPTION OF THE PREFERRED EMBODIMENT

Figure 2:
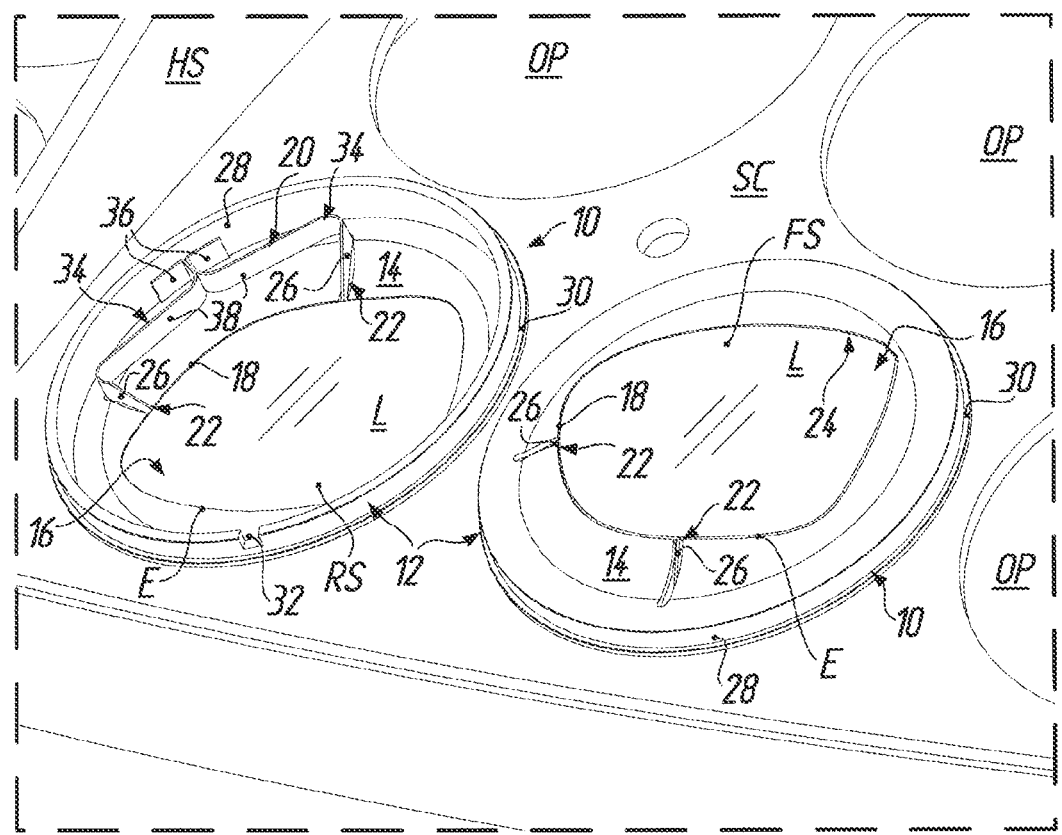
FIG. 2 shows a perspective view, to an enlarged scale, of the box coating apparatus according to FIG. 1 in correspondence with the detail II in FIG. 1, wherein the two individual holders are shown by way of example in two possible orientations in the sector of the substrate holder, namely on the left in FIG. 2 for coating the front side of the substrate held and on the right in FIG. 2 in a flipped over orientation for coating the backside of the substrate held.

FIGS. 1 and 2 are initially intended to explain an exemplary technical field of application of the present invention. Shown here is a box coating apparatus BC equipped for vacuum coating of eyeglass lenses L as substrates. Such a box coating apparatus BC is described in great detail, for example, in document EP 3 366 804 A1 of the present applicant, to which incorporation by express reference is made at this point for the details of the structure and function.

Figure 4:
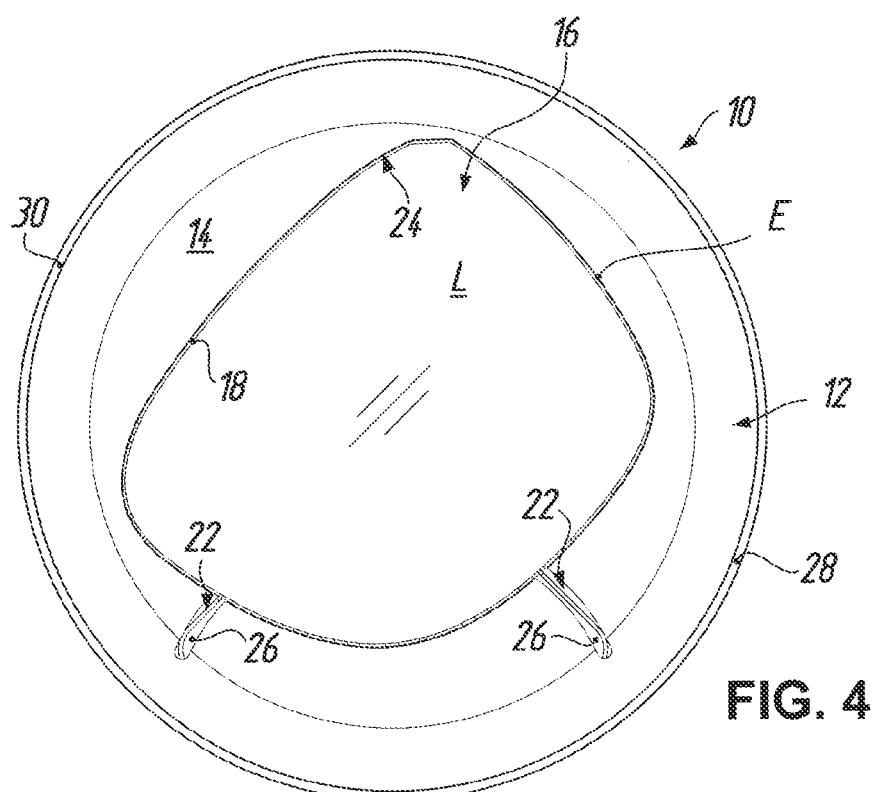
FIG. 4 shows a top view, to an enlarged scale, of the individual holder illustrated in FIG. 3, that holds the substrate within the opening of the masking portion.

In brief, the box coating apparatus BC basically has a vacuum chamber VC which contains an evaporation source ES and a substrate holder SH for holding a plurality of substrates L. The substrate holder SH is formed as a dome disposed vis-à-vis to the evaporation source ES and rotatable by a dome rotary drive RD about an axis of rotation RO which passes through the evaporation source ES, so that the substrates L held by the substrate holder SH on a plurality of circles can be moved on circular paths about the axis of rotation RO with a respective constant spacing relative to the evaporation source ES. In the illustrated embodiment, the dome-shaped substrate holder SH comprises a plurality of sectors SC removably attached to a holding structure HS of the substrate holder SH. Each sector SC has, uniformly distributed, i.e. with similar spacings therebetween, a plurality of circular openings OP each for receiving a holder 10 for holding a respective substrate L during vacuum coating thereof in the box coating apparatus BC, as described in detail below, wherein a shape of the substrate L, as seen in a plan view (cf. FIG. 4), is defined by an outer circumferential surface E of the substrate L.

According to FIGS. 3 to 7 in particular, the holder 10 comprises a base body 12 about a longitudinal axis AX, which has a masking portion 14 to prevent backside deposition which is bounded radially outwards with respect to the longitudinal axis AX by a circumferential rim or edge of the base body 12. The masking portion 14 is further provided with a central opening 16 that has an inner circumferential surface 18 adapted to receive the substrate L with its outer circumferential surface E. As indicated earlier, the opening 16 in the masking portion 14, as seen in a plan view (cf. FIGS. 4, 7, 9, 24 and 25), is shaped to correspond to or at least closely match the shape of the substrate L to be held without substantial gaps therebetween, i.e. between the outer circumferential surface E of the substrate L and the inner circumferential surface 18 of the opening 16. Further, a spring arrangement 20 is mounted with respect to the base body 12 to engage with the outer circumferential surface E of the substrate L so as to hold the substrate L within the opening 16 of the holder 10.

As will be explained in more detail, the masking portion 14 of the holder 10 is provided with at least one elongated slot 22—two slots 22 in the illustrated embodiment—having a length dimension and a width dimension substantially smaller than the length dimension, that extends with its length dimension oriented essentially radially outward from the inner circumferential surface 18 of the opening 16 with respect to the longitudinal axis AX. On a side of the opening 16 opposite said slot 22 the inner circumferential surface 18 of the opening 16 forms a support area 24 for the substrate L. Further, the spring arrangement 20 has at least one spring arm 26—two spring arms 26 in the embodiment shown—which is closely or tightly received in the slot 22 and adapted to resiliently bear against the outer circumferential surface E of the substrate L to urge the substrate L in the direction of the support area 24. The remaining part or remainder of the spring arrangement 20—i.e. those sections or portions of the spring arrangement 20 that are not the spring arm(s) 26 and at least serve to fix the spring arrangement 20 to the base body 12, as will be described later—is located underneath or covered by the masking portion 14 of the base body 12. Further, in the illustrated embodiment, the substrate L is not only urged in the direction of the support area 24, but even pressed against the support area 24 at the inner circumferential surface 18 of the opening 16 via the spring arms 26 by the spring force of the spring arrangement 20.

Figure 3:
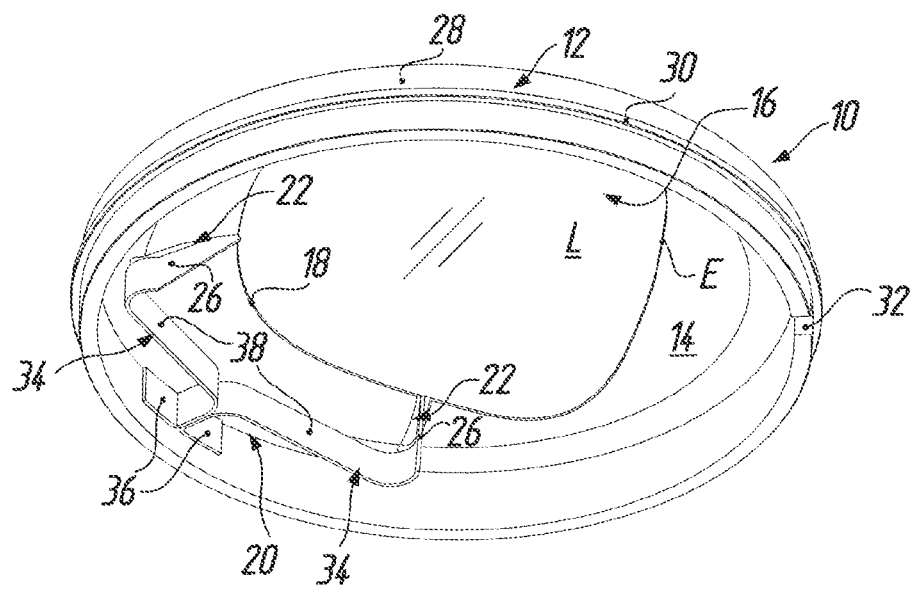
FIG. 3 shows a perspective view, to a further enlarged scale, of one of the individual holders according to FIG. 1 obliquely from below, in a state removed from the box coating apparatus according to FIG. 1 and with its base body rotated such that the view is exposed to a spring arrangement mounted to the base body, by means of which the substrate is held in an opening of a masking portion of the holder.
Figure 7:
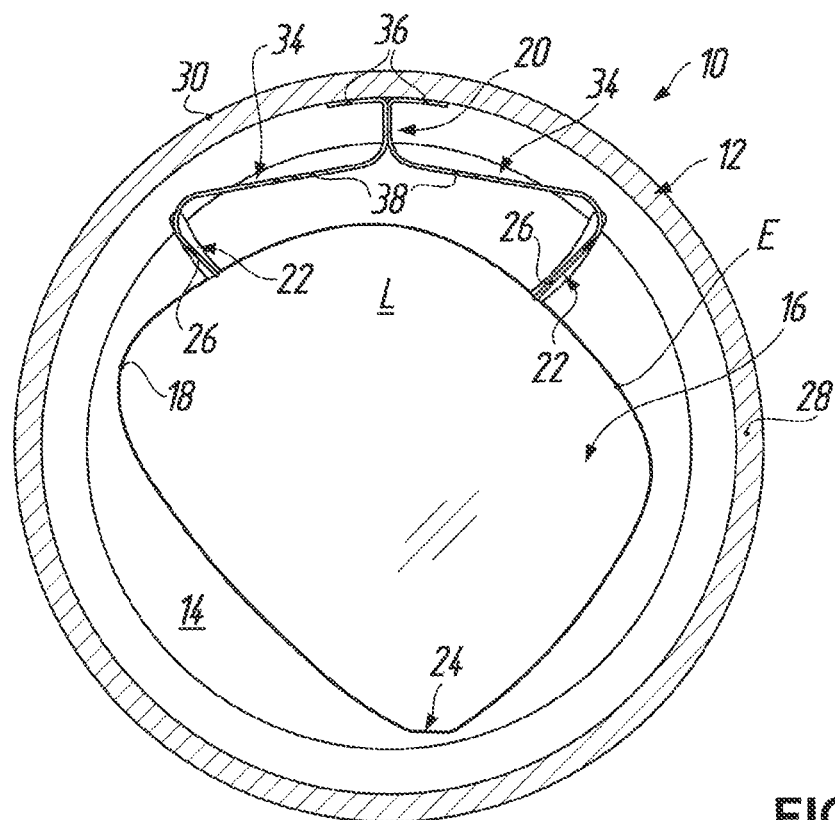
FIG. 7 shows a sectional view of the individual holder illustrated in FIG. 3 in correspondence with the section line VII-VII in FIG. 6.

As can best be seen in FIGS. 3 and 7, the base body 12 comprises a ring portion 28 of hollow cylindrical shape, which adjoins and delimits the masking portion 14 and is adapted to be received in the substrate holder SH of the box coating apparatus BC. More specifically, an outer diameter of the ring portion 28 of the base body 12 and an inner diameter of the openings OP in the sectors SC of the substrate holder SH are matched in such a way that the ring portion 28 fits tightly into the opening OP. As such, the ring portion 28 forms the above-mentioned circumferential rim or edge of the base body 12 of the holder 10, that bounds the areal masking portion 14 of the base body 12 radially outwards with respect to the longitudinal axis AX.

Figure 5:
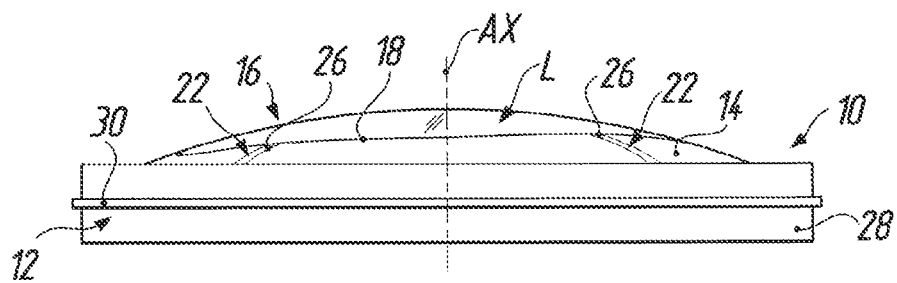
FIG. 5 shows a side view of the individual holder illustrated in FIG. 3 seen from below in FIG. 4.
Figure 6:
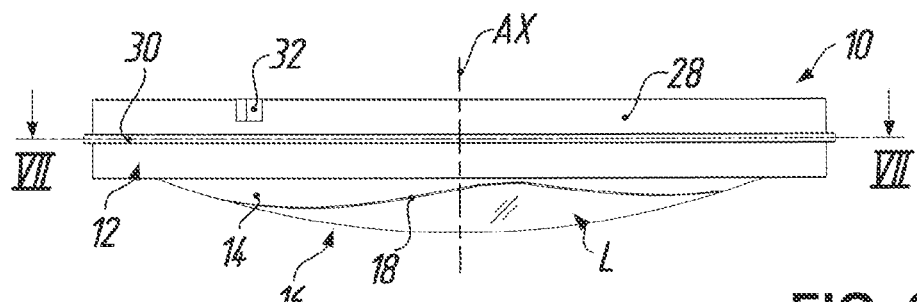
FIG. 6 shows a side view of the individual holder illustrated in FIG. 3 seen from above in FIG. 4.

According to FIGS. 3, 5 and 6 in particular, the ring portion 28 of the base body 12 is provided on its outer circumference with an annular protrusion 30 that is adapted to secure the holder 10 in the substrate holder SH of the box coating apparatus BC. To this end, the annular protrusion 30 of the holder 10 rests on the sector SC of the substrate holder SH, as shown in FIG. 2, so that the holder 10 cannot fall through the assigned opening OP in the sector SC. As further shown in FIGS. 5 and 6, the annular protrusion 30 is arranged at essentially half height of the ring portion 28. This basically allows the holder 10 to be used in two orientations with respect to the evaporation source ES of the box coating apparatus BC, either with the spring arrangement 20 facing the evaporation source ES (on the right in FIG. 2) or with the spring arrangement 20 facing away from the evaporation source ES (on the left in FIG. 2), the latter orientation being preferred. Accordingly, depending on the orientation of the holder 10 in the respective opening OP of the sector SC either a face surface FS of the substrate L or a rear surface RS of the substrate L can be coated.

As can further be seen in FIGS. 2, 3, 6 and 10, the ring portion 28 of the base body 12 comprises a recess 32 for angular orientation of the holder 10 about the longitudinal axis AX. Thus, the angular orientation of the holder 10—and therefore the position of the opening 16 in the masking portion 14, which deviates from the circular shape in the embodiment shown—can be easily determined, particularly for loading and unloading the substrate L, as will be described in more detail below.

Figure 10:
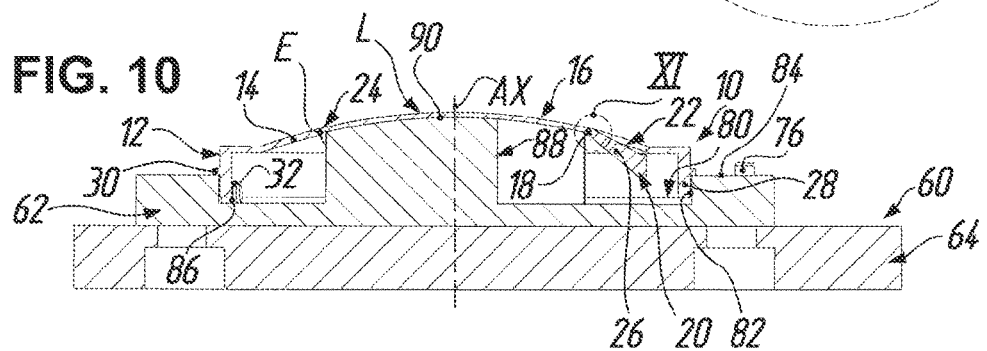
FIG. 10 shows a sectional view of the loading/unloading device according to FIG. 8, with the individual holder being received in the holder receptacle and the substrate being held by the holder, in correspondence with the section line X-X in FIG. 9.
Figure 18:
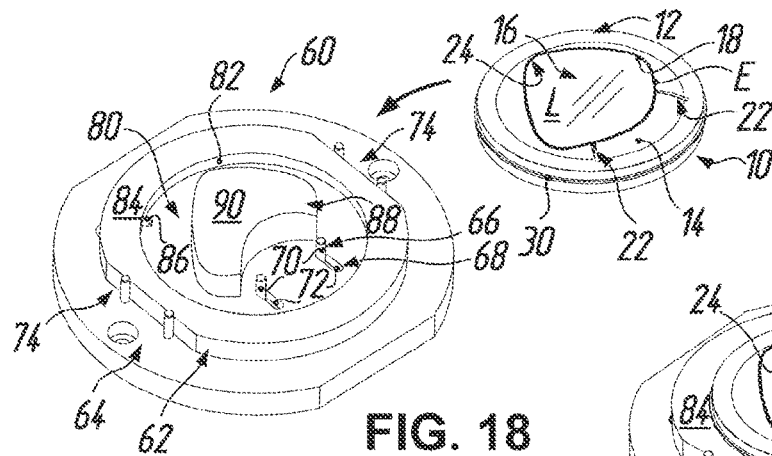
FIG. 18 to FIG. 23 show perspective views of the loading/unloading device of FIGS. 8 to 10 and the individual holder according to FIGS. 3 to 7 obliquely from above, illustrating the sequence of unloading the substrate from the holder with the aid of the loading/unloading device.

Furthermore, FIGS. 5, 6 and 10 show that the masking portion 14 of the base body 12, as seen in section or side view, has a curvature that is adapted to essentially match a curvature of the substrate L. This provides a smooth transition between the masking portion 14 and the substrate L held in the opening 16 of the holder 10; a step or the like is avoided, which could possibly shade the surface of the substrate L to be coated during coating.

Finally, with regard to the design of the base body 12 of the holder 10, it should be noted that the inner circumferential surface 18 of the opening 16, as seen in section (cf. FIG. 10 on the left hand side), is essentially parallel to the longitudinal axis AX of the holder 10. Thus, in this embodiment, the substrate L is held in the opening 16 of the holder 10—to be more precise, on the inner circumferential surface 18 of the opening 16—by means of the spring arrangement 20 primarily in a force-fit manner.

As indicated earlier, in the embodiment shown, the masking portion 14 of the holder 10 is provided with two of said slots 22, in each of which one spring arm 26 of the spring arrangement 20 is received. According to FIGS. 3, 4, 7 and 9 in particular, the two slots 22 are angularly offset from each other with respect to the longitudinal axis AX of the holder 10 so that the spring arms 26 are capable of urging the substrate L toward the support area 24 at the inner circumferential surface 18 of the opening 16 from different directions.

Further details of the spring arrangement 20 can be derived from, in particular, FIGS. 2, 3, 7, 10 and 11. Accordingly, the spring arrangement 20 comprises two spring portions 34 arranged mirror-symmetrically to each other. Each spring portion 34 has a base section 36 to which one of the spring arms 26 is connected in an angled manner via an intermediate section 38. Accordingly, the base and intermediate sections 36, 38 of the spring portions 34 form the above mentioned remainder of the spring arrangement 20 that is covered by the masking portion 14 in the preferred mounting orientation of the holder 10. The angled base sections 36 of the two spring portions 34 bear against each other and are fixed with respect to the base body 12 of the holder 10. In the area of mutual contact, the base sections 36 of the two spring portions 34 may be connected by a weld spot (not shown). In addition, in this embodiment, the two spring portions 34 are preferably welded to the metallic ring portion 28 of the base body 12 of the holder 10 in the area of contact thereof with the base sections 36 (also not shown in the figures).

Figure 11:
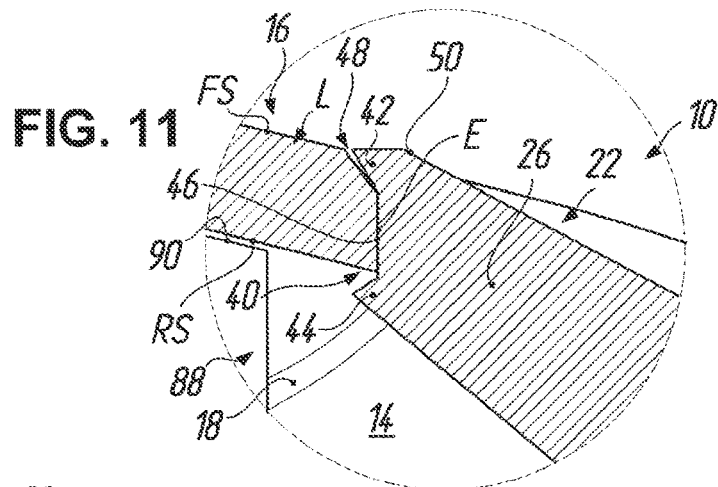
FIG. 11 shows a sectional view, to an enlarged scale, of the individual holder that holds the substrate, in correspondence with the detail XI in FIG. 10, illustrating a spring arm of the spring arrangement of the holder, that has at a free end thereof an essentially C-shaped profile positively engaging with an outer circumferential surface of the substrate held.

As further illustrated in the detail according to FIGS. 10 and 11, in the embodiment shown, each spring arm 26 has at a free end thereof an essentially C-shaped profile 40 for positive engagement with the outer circumferential surface E of the substrate L to be held. In this case, tooth-like projections 42, on the spring arms 26 prevent the substrate L from moving upwards or downwards with respect to the spring arm 26 in FIG. 11.

FIG. 11 further shows that the spring arm(s) 26 can be chamfered at a side surface 46 thereof facing the outer circumferential surface E of the substrate L to be held such that, as seen in section, a substantially V-shaped gap 48 remains between the outer circumferential surface E of the substrate L held and the side surface 46 of the spring arm 26, by which the spring arm 26 is spaced from the face surface FS to be coated of the substrate L. With such a design at the free end of the spring arms 26, obviously, the face surface FS of the substrate L can be coated without obstruction all the way to the edge, i.e. the outer circumferential surface E of the substrate L. As an alternative or in addition to this, the spring arm(s) 26 on a side 50 facing in the same direction as the masking portion 14 can be slanted (at the tooth-like projection 42 in FIG. 11) toward the face surface FS to be coated of the substrate L to be held so that there is no step between the side 50 of the spring arm 26 and the face surface FS that could obstruct coating material from reaching the face surface FS during a coating operation.

Figure 19:
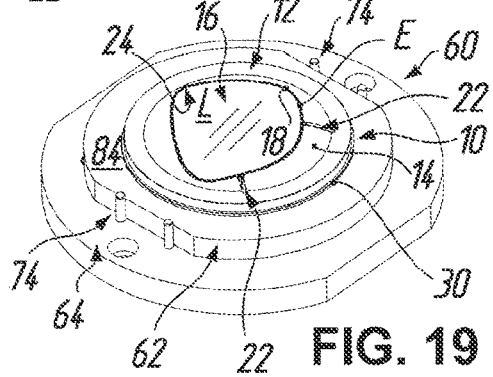
Figure 20:
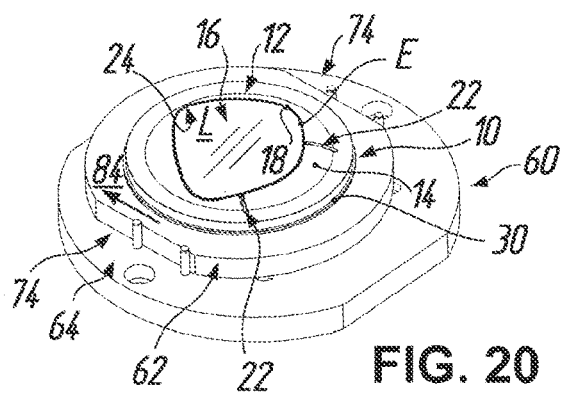
Figure 21:
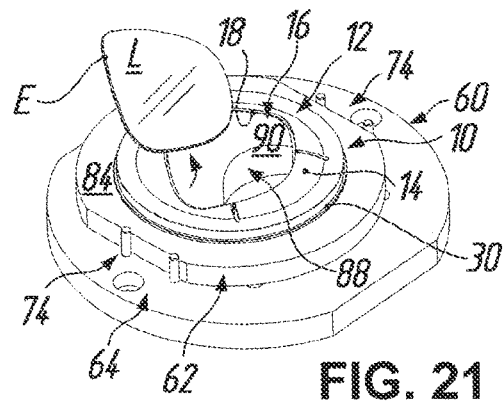
Figure 24:
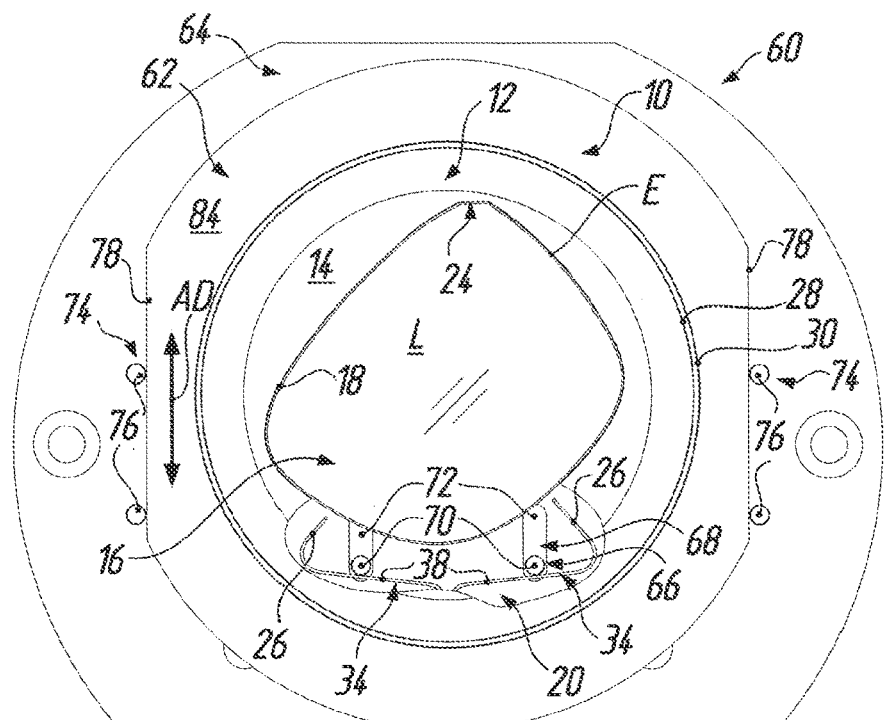
FIG. 24 and FIG. 25 show top views of the loading/unloading device with the individual holder and the substrate similar to FIG. 9, which are depicted broken up in the area of the spring arrangement of the holder, illustrating different relative positions of the holder receptacle and the base plate, in which release protrusions of the loading/unloading device that are attached to the base plate hold the spring arrangement of the holder away from the substrate (FIG. 24) or release the spring arrangement for contact with the edge of the substrate (FIG. 25).
Figure 25:
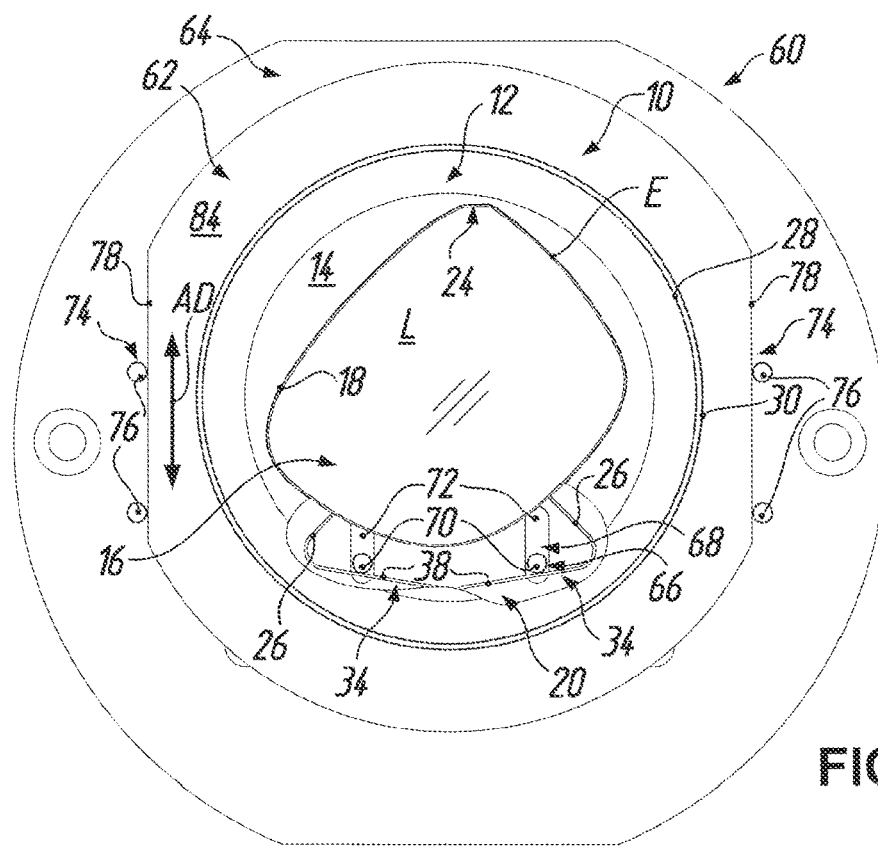

FIGS. 8 to 25 illustrate a preferred embodiment of a loading/unloading device 60 and its use for loading a substrate L, namely the spectacle lens shown, into the above described holder 10 and for unloading the substrate L from the holder 10. According to FIG. 8 in particular, the loading/unloading device 60 comprises a holder receptacle 62 for receiving the holder 10, which is movably guided with respect to a base plate 64 between a loading/unloading position (loading: FIGS. 14 & 15; unloading: FIGS. 20 & 21; both: FIG. 24) and a holding position (after loading: FIG. 16; prior to unloading: FIG. 19; both: FIG. 25) for the substrate L with respect to the holder 10.

Generally speaking, the base plate 64 is provided with at least one release protrusion 66 which is fixed with respect to the base plate 64 and extends through an associated recess 68 in the holder receptacle 62 to be selectively engageable with the spring arrangement 20 of the holder 10. This at least one release protrusion 66 is arranged to hold the spring arrangement 20 apart from the substrate L in the loading/unloading position of the holder receptacle 62 (cf. FIG. 24) and to release the spring arrangement 20 to abut the substrate L in the holding position of the holder receptacle 62 (see FIG. 25) so that the substrate L is held in the holder 10. To be more precise, in the embodiment shown, two cylinder pins 70 are mounted to the base plate 64 as said release protrusions 66 which extend through associated oblong holes 72 as said recesses 68 in the holder receptacle 62. These cylinder pins 70 are capable of engaging with the intermediate sections 38 of the spring arrangement 20 of the holder 10 for holding/releasing the spring arrangement 20 with respect to the substrate L.

Further, the holder receptacle 62, which rests flat on the base plate 64 (cf. FIG. 10) in a movable manner, is guided with respect to the base plate 64 by a guide arrangement 74 in an axial direction AD transverse to the longitudinal axis AX of the respective holder 10 received in the holder receptacle 62. According to FIGS. 8, 9, 24 and 25 in particular, in the embodiment shown, the guide arrangement 74 comprises cylindrical pins 76 mounted to the base plate 64, which interact with parallel side faces 78 of the holder receptacle 62, namely two cylindrical pins 76 on each side of the holder receptacle 62 that are assigned to the respective side face 78 of the holder receptacle 62.

Furthermore, as can best be seen in FIGS. 8, 12, 17, 18 and 23, the holder receptacle 62 comprises a centering geometry for the holder 10, which—in the embodiment shown—is formed by a recess 80 of the holder receptacle 62 adapted to cooperate with the base body 12 of the holder 10. More specifically, the recess 80 is bounded radially outward by a hollow cylindrical wall 82, an inner diameter of which is matched to an outer diameter of the ring portion 28 of the holder 10 so that the recess 80 can tightly receive the holder 10 with its ring portion 28. The ring portion 28 of the holder 10 can extend into the recess 80 of the holder receptacle 62 to the extent permitted by the circumferential annular protrusion 30 on the ring portion 28, which is capable of resting from above on a flat upper surface 84 of the holder receptacle 62, as shown in FIG. 10.

According to FIGS. 8, 10, 12, 17, 18 and 23, the holder receptacle 62 comprises a protrusion 86 adapted to engage with the above described recess 32 in the base body 12 of the holder 10 (see FIG. 10) for angular orientation of the holder 10 about the longitudinal axis AX with respect to the holder receptacle 62. In the embodiment shown, the protrusion 86 is formed by a cylinder pin as well.

Figure 8:
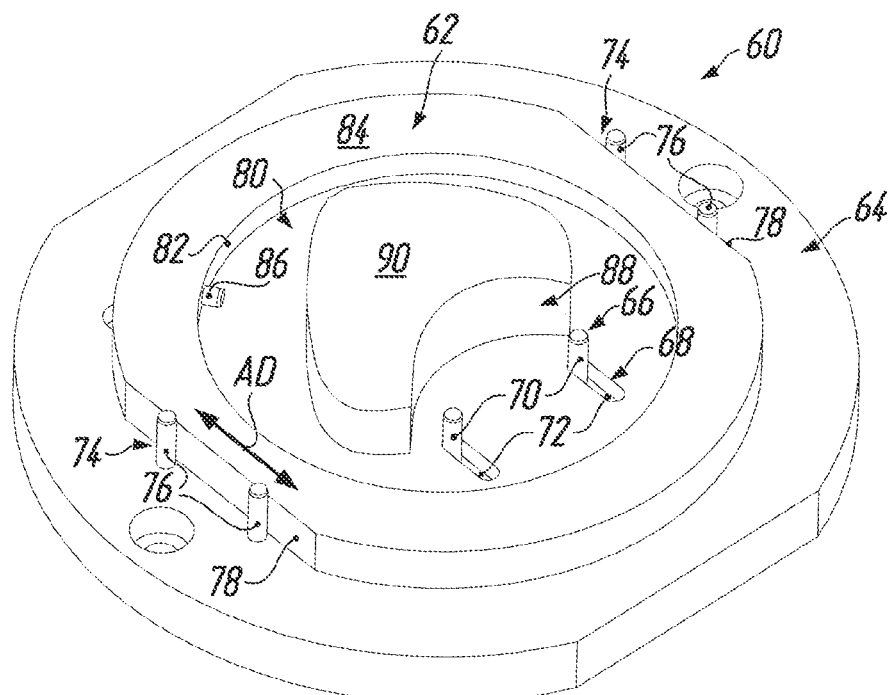
FIG. 8 shows a perspective view, to an enlarged scale, of a loading/unloading device according to the invention for loading a substrate into the individual holder illustrated in FIGS. 3 to 7 and for unloading the substrate from the holder, comprising a holder receptacle for receiving the holder, which is movably guided with respect to a base plate between a loading/unloading position and a holding position for the substrate with respect to the holder.
Figure 9:
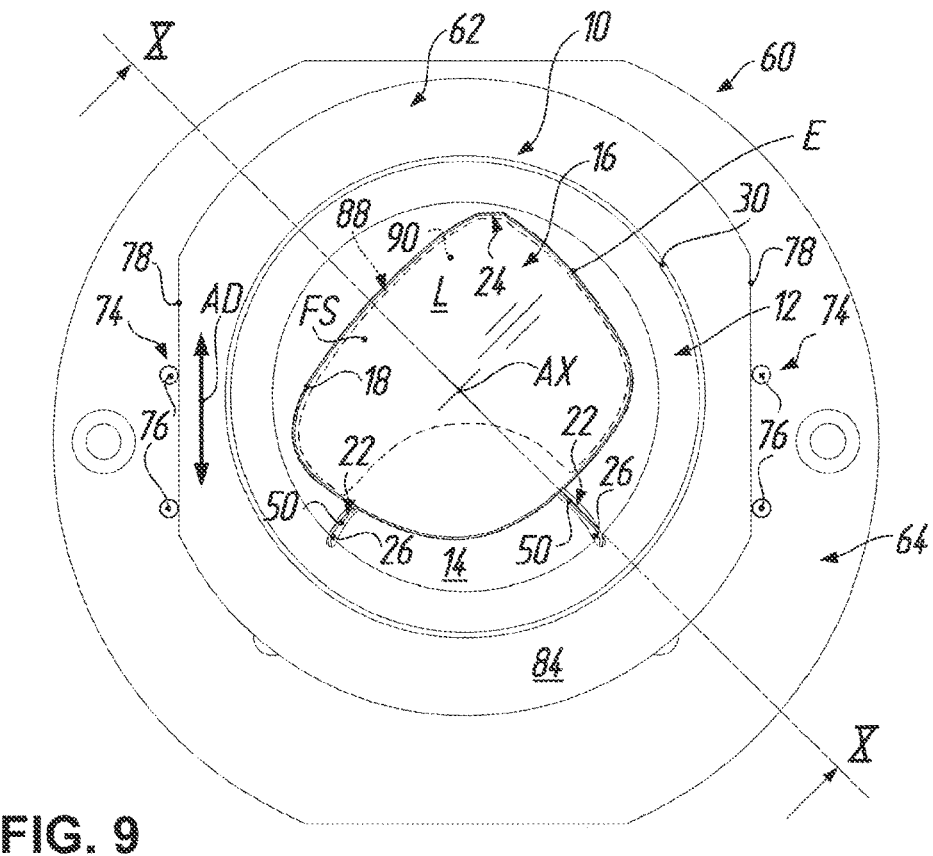
FIG. 9 shows a top view, to a further enlarged scale, of the loading/unloading device according to FIG. 8, with the individual holder of FIGS. 3 to 7 being received in the holder receptacle of the loading/unloading device, that is shown in an intermediate position with respect to the base plate, in which the substrate is already held within the opening of the masking portion of the holder with the aid of the spring arrangement of the holder.

Finally, the holder receptacle 62 is provided with a projection 88 at a central region of the recess 80 for supporting the substrate L, as can best be seen in FIGS. 8, 9 (indicated by dashed line), 10 to 14, 17, 18, 21 to 23. To this end, the projection 88 of the holder receptacle 62 forms a support surface 90 in the central region of the holder receptacle 62, which serves to seat the substrate L during a loading/unloading phase. As can be observed from FIG. 9, the projection 88 is arranged in the recess 80 of the holder receptacle 62 and shaped in such a way that it is able to support the substrate L with its support surface 90 over as full a surface area as possible. Only in an area near the spring arrangement 20 of the holder 10 is the projection 88 recessed in order to create space for the cylinder pins 70 mounted to the base plate 64 which are movable relative to the oblong holes 72 in the holder receptacle 62.

In the following the loading and unloading process of the substrate L into and from the above holder 10, respectively, with the aid of the above loading/unloading device 60 will be described with reference to FIGS. 12 to 25.

FIG. 12 shows the loading/unloading device 60 before the holder 10 is inserted for loading a substrate L. The holder receptacle 62 is in a position with respect to the base plate 64 in which the cylinder pins 70 received in the oblong holes 72 are close to the projection 88 so that they are spaced from the spring arrangement 20 of the holder 10 when the holder 10 is inserted in the recess 80 of the holder receptacle 62 and do not interfere with this insertion. As can be seen clearly on the right in FIG. 12, there is still no substrate L in the holder 10, so the spring arms 26 of the relaxed spring arrangement 20 of the holder 10 protrude from the assigned slots 22 into the opening 16 in the masking portion 14 of the base body 12. When inserting the holder into the holder receptacle 62, it must be rotated about its longitudinal axis AX to a correct angular position so that the protrusion 86 on the hollow cylindrical wall 82 of the holder receptacle 62 is able to engage in the recess 32 on the ring portion 28 of the holder 10, as shown in FIG. 10.

FIG. 13 shows the holder 10 in its inserted state in the holder receptacle 62 of the loading/unloading device 60. It can be clearly seen that the projection 88 of the holder receptacle 62 with its support surface 90 for the substrate L is aligned with respect to the opening 16 in the masking portion 14 as a result of the above described rotational angle orientation of the holder 10 with respect to the holder receptacle 62.

Now the holder receptacle 62 is shifted to the left with respect to the base plate 64 in FIG. 14, according to the arrow shown in FIG. 14. As a result, the cylinder pins 70 attached to the base plate 64 and extending through the oblong holes 72 in the holder receptacle 62 engage the spring arrangement 20 of the holder 10. More specifically, the cylinder pins 70 of the loading/unloading device 60 come into contact with the intermediate sections 38 of the spring portions 34 of the holder 10, as shown in FIGS. 24 and 25, causing the spring portions 34 to bend and retract with their spring arms 26 into the slots 22 so that the opening 16 in the masking portion 14 of the holder 10 is cleared. Now the substrate L can be inserted into the opening 16, as shown in FIG. 14 on the right, so that it comes to rest on the support surface 90 of the holder receptacle 62.

FIG. 15 shows the state in which the substrate L is inserted into the holder 10 but not yet fixed to the holder 10 because the spring arrangement 20 of the holder 10 is still biased away from the substrate L with the aid of the loading/unloading device 60. This corresponds to the condition shown in FIG. 24. The spring arms 26 with their C-shaped ends are still spaced from the substrate L.

In the next step, the holder receptacle 62 is moved back to the right as indicated by the arrow in FIG. 16, causing the spring arrangement 20 to relax until the spring arms 26 of the spring portions 34 come into contact with the outer circumferential surface E of the substrate L and clamp it against the support area 24 in the opening 16 of the masking portion 14. This corresponds to the condition shown in FIG. 25.

The substrate L is now firmly clamped in the holder 10 so that the holder 10 can be removed from the loading/unloading device 60, as shown in FIG. 17. The holder 10 with the substrate L is now inserted into an opening OP of a sector SC of the substrate holder SH of the box coating apparatus BC according to FIG. 1 in a manner known per se. After the sectors SC of the substrate holder SH have been fully loaded or loaded as desired with a number of holders 10 each holding a substrate L, the actual coating can take place in the box coating apparatus BC, which is also known per se and therefore requires no further explanation at this point. As a result of the design of the holder 10, the substrate L is coated up to the edge E on one side, while the other side of the substrate L is protected from unwanted deposition by the evaporation source ES through the masking portion 14 of the holder 10.

Figure 22:
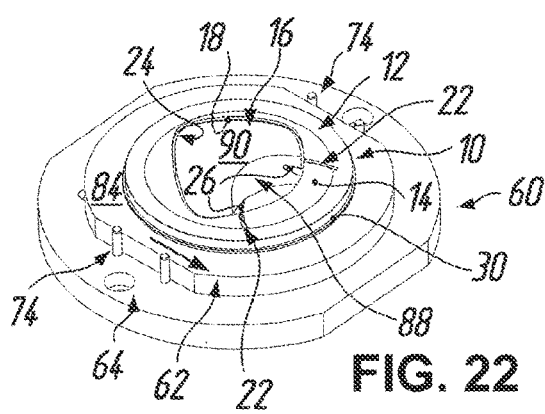
Figure 23:
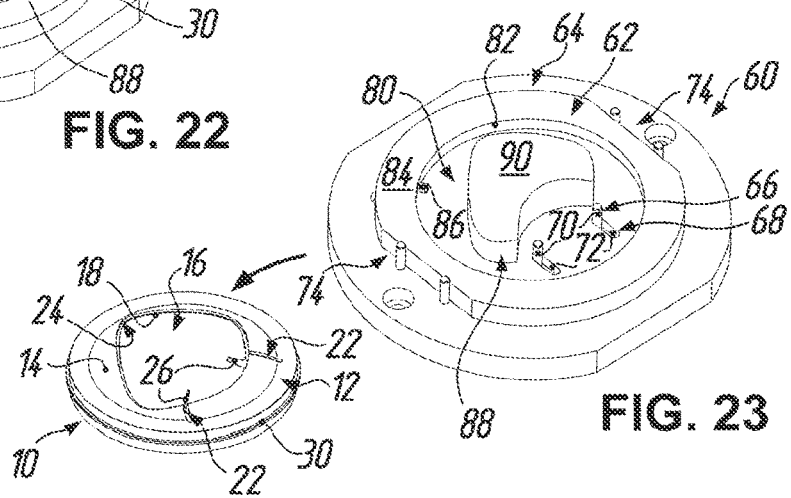

After coating, the substrates L are unloaded from the respective holders 10 in a similar way, as shown in FIGS. 18 to 23. First, the holder 10 with the substrate L held is inserted into the holder receptacle 62 of the loading/unloading device 60 in proper angular alignment (see FIG. 18), resulting in the state as shown in FIG. 19. By moving the holder receptacle 62 relative to the base plate 64 (see the arrow in FIG. 20), the spring arrangement 20 of the holder 10 is then tensioned so that the spring arms 26 with their C-shaped ends are disengaged from the substrate L, as shown in FIG. 24. Now that the opening 16 in the masking portion 14 of the holder 10 is clear of the spring arms 26, as shown in FIG. 24, which have been retracted into the assigned slots 22, the substrate L—which came to rest on the support surface 90 of the projection 88—can be removed from the holder 10 as shown in FIG. 21. By moving the holder receptacle 62 back with respect to the base plate 64 of the loading/unloading device 60 according to the arrow in FIG. 22, the spring arrangement 20 of the holder 10 is relaxed again so that the spring arms 26 protrude from their slots 22 into the opening 16, as shown in FIG. 22. Now the holder 10 can be removed from the loading/unloading device 60 again according to FIG. 23.

As mentioned at the beginning, the relative movements between the holder receptacle 62 and the base plate 64 of the loading/unloading device 60 can be generated manually or by means of a suitable drive. The handling of the substrates L and the loaded or unloaded holders 10 can also be done manually or (partially) automated with a robot or the like.

A holder for holding a substrate during vacuum coating comprises a base body with a masking portion provided with an opening adapted to receive the substrate. The opening in the masking portion is shaped to correspond to or closely match the shape of the substrate to be held without substantial gaps therebetween. The masking portion is provided with a slot that extends radially outward from an inner edge of the opening. A narrow spring arm of a spring arrangement mounted to the holder is received in the slot and adapted to resiliently bear against an outer edge of the substrate to urge the substrate toward a support area at the inner edge of the opening on a side opposite said slot. Further, a loading/unloading device for loading the substrate into such holder and for unloading it therefrom is proposed.

A loading/unloading device (60) for loading a substrate (L), in particular a spectacle lens, into a holder (10) according to any one of the preceding claims and for unloading the substrate (L) from the holder (10), comprising a holder receptacle (62) for receiving the holder (10), which is movably guided with respect to a base plate (64) between a loading/unloading position and a holding position for the substrate (L) with respect to the holder (10), wherein said base plate (64) is provided with at least one release protrusion (66) that is fixed with respect to said base plate (64) and extends through an associated recess (68) in said holder receptacle (62) to be selectively engageable with said spring arrangement (20) of the holder (10), wherein said release protrusion (66) is arranged to hold said spring arrangement (20) apart from the substrate (L) in said loading/unloading position of said holder receptacle (62) and to release said spring arrangement (20) to abut the substrate (L) in the holding position of said holder receptacle (62) so that the substrate (L) is held in the holder (10).

Variations and modifications are possible without departing from the scope and spirit of the present invention as defined by the appended claims.

We claim:

1. A holder (10) for holding a substrate (L), in particular a spectacle lens, during vacuum coating thereof in a box coating apparatus (BC), a shape of the substrate (L), as seen in a plan view, being defined by an outer circumferential surface (E) of the substrate (L), the holder (10) comprising a base body (12) about a longitudinal axis (AX), with an areal masking portion (14) which is bounded radially outwards with respect to said longitudinal axis (AX) by a circumferential rim of said base body (12) and which is provided with a central opening (16) having an inner circumferential surface (18) adapted to receive the substrate (L) with its outer circumferential surface (E), and a spring arrangement (20) mounted with respect to said base body (12) to engage with the outer circumferential surface (E) of the substrate (L) so as to hold the substrate (L) within said opening (16) of the holder (10), characterized in that said opening (16) in said masking portion (14), as seen in a plan view, is shaped to correspond to or at least closely match the shape of the substrate (L) to be held without substantial gaps therebetween, wherein said masking portion (14) is provided with at least one slot (22) having a length dimension and a width dimension substantially smaller than the length dimension and extending with its length dimension oriented essentially radially outward from said inner circumferential surface (18) of said opening (16), said inner circumferential surface (18) forming a support area (24) for the substrate (L) on a side of said opening (16) opposite said slot (22), and wherein said spring arrangement (20) has at least one spring arm (26) which is tightly received in said slot (22) and adapted to resiliently bear against the outer circumferential surface (E) of the substrate (L) to urge the substrate (L) in the direction of said support area (24), while a remainder of said spring arrangement (20), which also serves to fix said spring arrangement (20) to said base body (12), is covered by said masking portion (14).

2. The holder (10) according to claim 1, characterized in that said masking portion (14) is provided with two of said slots (22), in each of which one spring arm (26) of said spring arrangement (20) is received, wherein said slots (22) are angularly offset from each other with respect to said longitudinal axis (AX) of the holder (10) so that said spring arms (26) are capable of urging the substrate (L) toward said support area (24) at said inner circumferential surface (18) of said opening (16) from different directions.

3. The holder (10) according to claim 2, characterized in that said spring arrangement (20) comprises two spring portions (34) arranged mirror-symmetrically to each other, each spring portion (34) having a base section (36) to which one of said spring arms (26) is connected in an angled manner via an intermediate section (38), wherein said base sections (36) are bearing against each other and are fixed with respect to said base body (12) of the holder (10), and wherein said remainder of said spring arrangement (20) that is covered by said masking portion (14) is formed by said base and intermediate sections (36, 38) of said spring portions (34).

4. The holder (10) according to claim 3, characterized in that
each spring arm (26) has at a free end thereof an essentially C-shaped profile (40) for positive engagement with the outer circumferential surface (E) of the substrate (L) to be held, and/or
each spring arm (26) is chamfered at a side surface (46) thereof facing the outer circumferential surface (E) of the substrate (L) to be held such that, as seen in section, a substantially V-shaped gap (48) remains between the outer circumferential surface (E) of the held substrate (L) and said side surface (46) of said spring arm (26), by which said spring arm (26) is spaced from a face surface (FS) to be coated of the substrate (L), and/or
each spring arm (26) on a side (50) facing in the same direction as said masking portion (14) is slanted toward a face surface (FS) to be coated of the substrate (L) to be held so that there is no step between said side (50) of said spring arm (26) and the face surface (FS) that could obstruct coating material from reaching the face surface (FS) during a coating operation.

5. The holder (10) according to claim 4, characterized in that said inner circumferential surface (18) of said opening (16), as seen in section, is essentially parallel to said longitudinal axis (AX) of the holder (10).

6. The holder (10) according to claim 5, characterized in that said base body (12) comprises a ring portion (28) of hollow cylindrical shape forming said circumferential rim of said base body (12), said ring portion (28) adjoining and delimiting said masking portion (14) and being adapted to be received in a substrate holder (SH) of the box coating apparatus (BC).

7. The holder (10) according to claim 6, characterized in that said ring portion (28) of said base body (12) is provided on its outer circumference with an annular protrusion (30) that is adapted to secure the holder (10) in the substrate holder (SH) of the box coating apparatus (BC).

8. The holder (10) according to claim 7, characterized in that said annular protrusion (30) is arranged at essentially half height of said ring portion (28).

9. The holder (10) according to claim 8, characterized in that said ring portion (28) of said base body (12) comprises a recess (32) for angular orientation of the holder (10) about said longitudinal axis (AX).

10. The holder (10) according to claim 9, characterized in that said masking portion (14) of said base body (12), as seen in section, has a curvature that is adapted to essentially match a curvature of the substrate (L).

11. The holder (10) according to claim 9, characterized in that said masking portion (14) of said base body (12), as seen in section, has a curvature that is adapted to essentially match a curvature of the substrate (L).

12. The holder (10) according to claim 5, characterized in that said base body (12) comprises a ring portion (28) of hollow cylindrical shape forming said circumferential rim of said base body (12), said ring portion (28) adjoining and delimiting said masking portion (14) and being adapted to be received in a substrate holder (SH) of the box coating apparatus (BC).

13. The holder (10) according to claim 12, characterized in that said ring portion (28) of said base body (12) comprises a recess (32) for angular orientation of the holder (10) about said longitudinal axis (AX).

14. The holder (10) according to claim 1, characterized in that
each spring arm (26) has at a free end thereof an essentially C-shaped profile (40) for positive engagement with the outer circumferential surface (E) of the substrate (L) to be held, and/or
each spring arm (26) is chamfered at a side surface (46) thereof facing the outer circumferential surface (E) of the substrate (L) to be held such that, as seen in section, a substantially V-shaped gap (48) remains between the outer circumferential surface (E) of the held substrate (L) and said side surface (46) of said spring arm (26), by which said spring arm (26) is spaced from a face surface (FS) to be coated of the substrate (L), and/or
each spring arm (26) on a side (50) facing in the same direction as said masking portion (14) is slanted toward a face surface (FS) to be coated of the substrate (L) to be held so that there is no step between said side (50) of said spring arm (26) and the face surface (FS) that could obstruct coating material from reaching the face surface (FS) during a coating operation.

15. The holder (10) according to claim 1, characterized in that said inner circumferential surface (18) of said opening (16), as seen in section, is essentially parallel to said longitudinal axis (AX) of the holder (10).

16. A loading/unloading device (60) for loading a substrate (L), in particular a spectacle lens, into a holder (10) according to claim 1 and for unloading the substrate (L) from the holder (10), comprising a holder receptacle (62) for receiving the holder (10), which is movably guided with respect to a base plate (64) between a loading/unloading position and a holding position for the substrate (L) with respect to the holder (10), wherein said base plate (64) is provided with at least one release protrusion (66) that is fixed with respect to said base plate (64) and extends through an associated recess (68) in said holder receptacle (62) to be selectively engageable with said spring arrangement (20) of the holder (10), wherein said release protrusion (66) is arranged to hold said spring arrangement (20) apart from the substrate (L) in said loading/unloading position of said holder receptacle (62) and to release said spring arrangement (20) to abut the substrate (L) in the holding position of said holder receptacle (62) so that the substrate (L) is held in the holder (10).

17. The loading/unloading device (60) according to claim 16,
wherein said holder receptacle (62) has a support surface (90) in a central region of said holder receptacle (62), which serves to seat the substrate (L) during a loading/unloading phase, and/or
wherein said holder receptacle (62) comprises a centering geometry for the holder (10), which is formed by a recess (80) or at least one projection of the holder receptacle (62) adapted to cooperate with the base body (12) of the holder (10), and/or
wherein said holder receptacle (62) comprises a protrusion (86) adapted to engage with said recess (32) in said base body (12) of the holder (10) for angular orientation of the holder (10) about said longitudinal axis (AX) with respect to said holder receptacle (62).

18. The loading/unloading device (60) according to claim 16, wherein two cylinder pins (70) are mounted to said base plate (64) as said release protrusions (66) which extend through associated oblong holes (72) in said holder receptacle (62), wherein said cylinder pins (70) are capable of engaging with said intermediate sections (38) of said spring arrangement (20) of the holder (10) for holding/releasing said spring arrangement (20) with respect to the substrate (L).

19. The loading/unloading device (60) according to claim 16, wherein said holder receptacle (62) is guided with respect to said base plate (64) by a guide arrangement (74) in an axial direction (AD) transverse to said longitudinal axis (AX).

20. The loading/unloading device (60) according to claim 19, wherein said guide arrangement (74) comprises cylindrical pins (76) mounted to said base plate (64), which interact with parallel side faces (78) of said holder receptacle (62).

* * * * *